United States Patent [19]

East

[11] Patent Number: 4,954,288

[45] Date of Patent: Sep. 4, 1990

[54] SIDE CHAIN LIQUID CRYSTALLINE POLYMERS EXHIBITING NONLINEAR OPTICAL RESPONSE

[75] Inventor: Anthony J. East, Morris, N.J.

[73] Assignee: Hoechst Celanese Corp., Somerville, N.J.

[21] Appl. No.: 435,759

[22] Filed: Nov. 14, 1989

Related U.S. Application Data

[62] Division of Ser. No. 280,096, Dec. 5, 1988, Pat. No. 4,913,836.

[51] Int. Cl.$^5$ .............................................. C09K 19/52
[52] U.S. Cl. .......................... 252/299.01; 350/350 R; 428/1; 252/582; 252/587; 252/589; 252/299.62; 526/326; 526/329.4; 526/334; 528/425; 528/40
[58] Field of Search ........... 252/582, 589, 587, 299.01, 252/299.62; 428/1; 350/350 R; 526/321, 326, 328, 328.5, 329.4, 334; 528/425, 31, 40, 42

[56] References Cited

FOREIGN PATENT DOCUMENTS 61-236827 10/1986 Japan .............................. 252/299.01

OTHER PUBLICATIONS

Kato, T. et al., J. Polym. Sci., Part A: Polym Chem. 27(5) 1447, 1989.
Chen, J. et al., Huadong Huagong Xueyuan Xuebao 13(1) 57, 1987.
Ober, C. K. et al., Polym. Bull. (Berlin), 15(3), 233, 1986.
Bilibin, A. et al., Makromol. Chem. 186 (8), 1575, 1985.
Nonlinear Optical Properties of Polymers, A. J. Heeger et al, eds. M.R.S., Pittsburgh, Pa. 1988.
Nonlinear Optical Properties of Organic Materials, G. Khanarian, Ed. S.P.I.E., vol. 971, 1988.

Primary Examiner—John S. Maples
Assistant Examiner—Richard Treanor
Attorney, Agent, or Firm—DePaoli & O'Brien

[57] ABSTRACT

This invention provides novel side chain liquid crystalline polymers. An invention polymer exhibits nonlinear optical response, and has utility as a transparent nonlinear optical component in optical light switch and light modulator devices.

A present invention side chain liquid crystalline polymer is illustrated by the following acrylate structure with pendant mesogenic side chains:

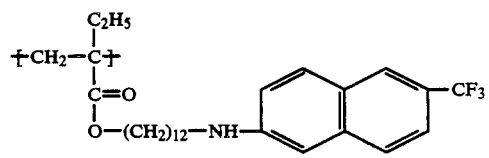

9 Claims, No Drawings

SIDE CHAIN LIQUID CRYSTALLINE POLYMERS EXHIBITING NONLINEAR OPTICAL RESPONSE

This application is a division of application Ser. No. 280,096, filed Dec. 5, 1988, now U.S. Pat. No. 4,913,836.

CROSS-REFERENCE TO RELATED APPLICATIONS

The subject matter of this patent application is related to that disclosed in patent application Ser. No. 822,090, now abandoned; No. 922,092, now U.S. Pat. No. 4,694,066; No. 822,093, now U.S. Pat. No. 4,868,250; No. 822,094, now U.S. Pat. No. 4,835,235; and No. 898,982, now U.S. Pat. No. 4,795,664.

BACKGROUND OF THE INVENTION

It is known that organic and polymeric materials with large delocalized $\pi$-election systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September, 1982. Papers presented at the meeting are published in ACS Symposium Series 233, American Chemical Society, Washington, D.C. 1983.

The above recited publications are incorporated herein by reference.

Of more specific interest with respect to the present invention embodiments is prior art relating to side chain liquid crystalline polymers, such as the five articles published on pages 275–368 of "Polymeric Liquid Crystals", edited by A. Blumstein (Plenum Publishing Corporation, New York, 1985).

U.S. Pat. No. 4,293,435 describes liquid crystalline polymers corresponding to the formula:

$$+CH_2-C(R_1)+$$
$$\quad\quad\quad |$$
$$\quad\quad\quad CO_2-(CH_2)_n-R_3$$

where $R_1$ is hydrogen or methyl, n is an integer from 1 to 6, and $R_3$ represents a structural element containing at least two phenylene groups.

Makromol, 179,2541 (1978) by H. Finkelmann et al describes a model consideration for liquid crystalline polymers with biphenyl groups as mesogenic entities.

J. Polym. Sci., 19, 1427 (1981) by Paleos et al describes the synthesis of liquid crystalline polymers which are prepared by the interaction of poly(acryloyl chloride) with mesogenic compounds such as p-aminobiphenyl.

Eur. Polym. J., 18, 651 (1982) describes comb-like liquid crystalline polymers of the smectic and nematic types with cyanobiphenyl groups in the side chain:

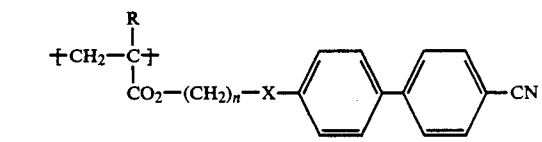

where R is hydrogen or methyl, n is an integer of 2–11, and X is an oxy, alkylene or carbonyloxy divalent radical.

Other publications which describe thermotropic liquid crystalline polymers with side chain induced crystallinity include Polymer, 25, 1342 (1984); Eur. Polym. J., 21, No. 7, 645 (1985); Polymer, 26, 615 (1985); and references cited therein.

The above listed publications are incorporated herein by reference.

There is continuing interest in the theory and practice of liquid crystalline polymers which are characterized by an oriented state of comb-like side chain structures.

There is also an increasing research effort to develop new nonlinear optical organic systems for prospective novel phenomena and devices adapted for laser frequency conversion, information control in optical circuitry, light valves and optical switches The potential utility of organic materials with large second order and third order nonlinearities for very high frequency application contrasts with the bandwidth limitations of conventional inorganic electrooptic materials.

Accordingly, it is an object of this invention to provide novel liquid crystalline polymers.

It is another object of this invention to provide thermotropic liquid crystalling polymers having mesogenic side chains which exhibit nonlinear optical response.

It is a further object of this invention to provide optical light switch and light modulator devices with a transparent polymeric nonlinear optical component comprising a thermotropic side chain liquid crystalline polymer.

Other objects and advantages of the present invention shall become apparent from the accompanying description and examples.

DESCRIPTION OF THE INVENTION

One or more objects of the presents invention are accomplished by the provision of a thermotropic liquid crystalline polymer which is characterized by a recurring monomeric unit corresponding to the formula:

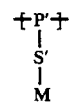

where P' is a polymer main chain unit, S' is a flexible spacer group having a linear chain length of between about 1-20 atoms, M is a pendant mesogen containing a divalent 2,6-naphthylene radical, and where the pendant mesogens comprise at least about 10 weight percent of the polymer.

The main chain of the liquid crystalline polymer can have various structures such as polyvinyl, polysiloxane, polyoxyalkylene, polyester, polyamide, and the like. The main chain structure can be either a homopolymer or copolymer type.

A present invention liquid crystalline polymer typically has a glass transition temperature between about 0°-120° C, and exhibits smectic and/or nematic textures in the mesophase range between the glass transition temperature and the clearing temperature, i.e., the isotropic phase.

A present invention liquid crystalline polymer preferably has a weight average molecular weight in the range between about 2000-200,000.

In another embodiment this invention provides a thermotropic liquid crystalline polymer which is characterized by a recurring monomeric unit corresponding to the formula:

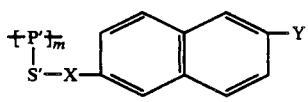

where P' is a polymer main chain unit, m is an integer with a value of at least 5, S' is a flexible spacer group having a linear chain length of between about 2-20 atoms, X is an electron-donating substituent, and Y is an electron-withdrawing substituent.

A present invention thermotropic liquid crystalline polymer can be formed into a transparent nonlinear optical medium such as a film or fiber, having utility as a nonlinear optical component in an optical or electrooptical device.

In another embodiment this invention provides a thermotropic liquid crystalline polymer which is characterized by a recurring monomeric unit corresponding to the formula:

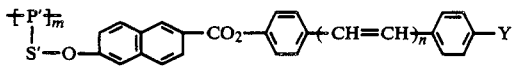

where P' is a polymer main chain unit, m is an integer with a value of at least 5, n is an integer with a value of zero or one, S' is a flexible spacer group having a linear chain length of between about 2-20 atoms, and Y is an electron-withdrawing substituent.

In another embodiment this invention provides a thermotropic liquid crystalline polymer which is characterized by a recurring monomeric unit corresponding to the formula:

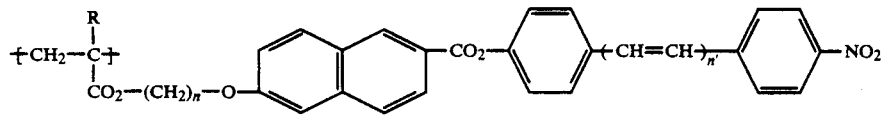

where R is hydrogen or a $C_1$-$C_4$ alkyl group; n is an integer with a value of 2-20, n' is an integer with a value of zero or one, and where the recurring monomeric unit comprises at least about 50 weight percent of the polymer, and the polymer has a glass transition temperature between about 0°-120° C.

In another embodiment this invention provides a thermotropic liquid crystalline polymer which is characterized by a recurring monomeric unit corresponding to the formula;

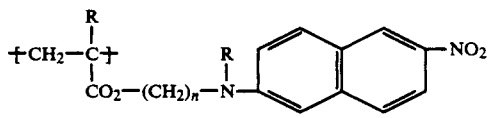

where R is hydrogen or a $C_1$-$C_4$ alkyl group, n is an integer with a value of 2-20, and where the recurring monomeric unit comprises at least about 50 weight percent of the polymer, and the polymer has a glass transition temperature between about 0°-120° C.

Illustrative of $C_1$-$C_4$ alkyl groups are methyl, ethyl, propyl, isopropyl, butyl, isobutyl and 2-butyl.

The term "electron-donating" as employed herein refers to organic substituents which contribute electron density to the $\pi$-electron system when the conjugated electronic structure is polarized by the input of electromagnetic energy.

The term "electron-withdrawing" as employed herein refers to electronegative organic substituents which attract electron density from the $\pi$-electron system when the conjugated electron structure is polarized by the input of electromagnetic energy.

Illustrative of electron-donating groups as represented by X in the above formulae are amino, alkyl, alkoxy, alkylthio, hydroxy, thiolo, acyloxy, vinyl, halo, and the like.

Illustrative of electron-withdrawing substituents as represented by Y in the above formulae are nitro, haloalkyl, cyano, acyl, alkoxysulfonyl, tricyanovinyl, and the like.

The term "transparent" as employed herein refers to an optical medium which is transparent or light transmitting with respect to incident fundamental light frequencies and created light frequencies. In a nonlinear optical device, a present invention nonlinear optical medium component is transparent to both the incident and exit light frequencies.

The term "thermotropic polymer" as employed herein refers to a polymer which is liquid crystalline (i.e., anisotropic) in the melt phase.

The term "isotropic" as employed herein refers to a transparent medium of a liquid crystalline polymer in which the optical properties are equivalent in all tensor directions.

A present invention thermotropic liquid crystalline polymer typically exhibits a smectic mesophase and has excellent stability under high temperature and applied external field conditions.

In another embodiment this invention provides an optical switch or light modulator device with an organic nonlinear optical component consisting of a transparent solid medium comprising a polymer which is characterized by a recurring monomeric unit corresponding to the formula:

where P' is a polymer main chain unit, S' is a flexible spacer group having a linear chain length of between about 1-20 atoms, M is a pendant mesogen containing a divalent 2,6-naphthylene radical, and where the pendant mesogens comprise at least about 10 weight percent of the polymer and exhibit nonlinear optical susceptibility.

In another embodiment this invention provides an optical switch or light modulator device with an organic nonlinear optical component consisting of a transparent solid medium comprising a polymer which is characterized by a recurring monomeric unit corresponding to the formula:

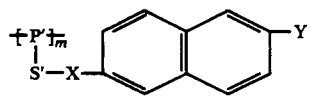

where P' is a polymer main chain unit, m is an integer with a value of at least 5, S' is a flexible spacer group having a linear chain length of between about 2-20 atoms, X is an electron-donating substituent, and Y is an electron-withdrawing substituent.

In a further embodiment this invention provides an optical switch or light modulator device with an organic nonlinear optical component consisting of a transparent solid medium comprising a polymer which is characterized by a recurring monomeric unit corresponding to the formula:

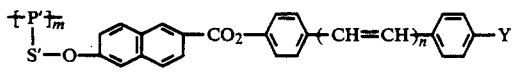

where P' is a polymer main chain unit, m is an integer with a value of at least 5, n is an integer with a value of zero or one, S' is a flexible spacer group having a linear chain length of between about 2-20 atoms, and Y is an electron-withdrawing substituent.

An invention optical light switch or light modulator device typically will have an organic nonlinear optical component which is a transparent solid medium of a thermotropic liquid crystalline polymer which has a stable orientation of an external field-induced alignment of mesogens.

SYNTHESIS OF LIQUID CRYSTALLINE POLYMERS

The preparation of a polyvinyl liquid crystalline polymer with mesogenic side chains is illustrated by the following flow diagram:

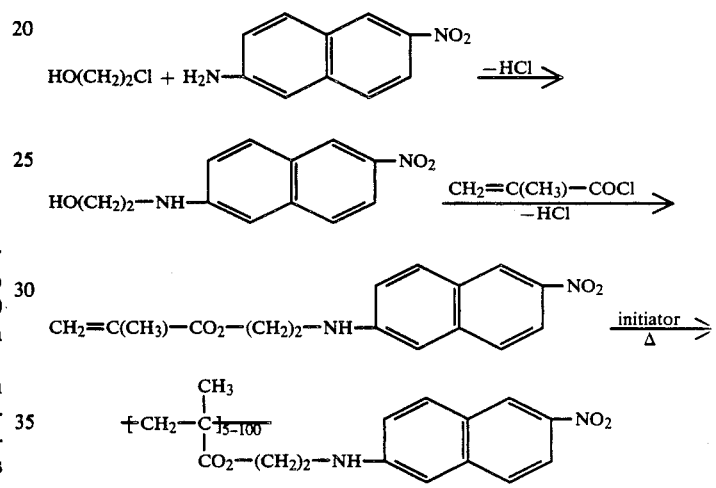

The preparation of a polysiloxane liquid crystalline polymer with mesogenic side chains is illustrated by the following flow diagram of a reaction between an organohydrogenpolysiloxane and a vinyl-substituted mesogenic compound:

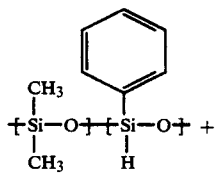

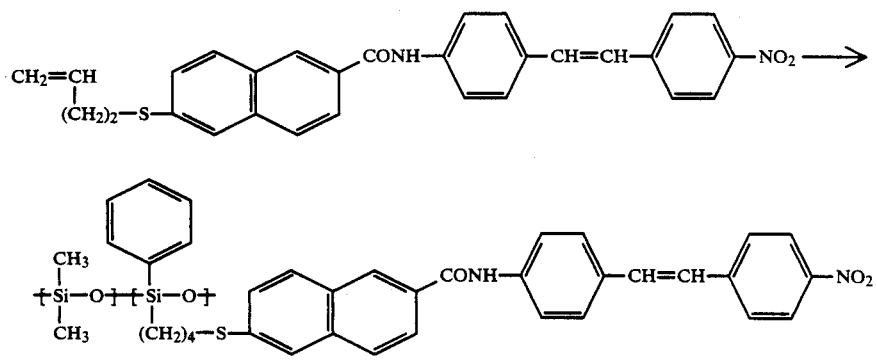

The average number of silicon atoms in the organopolysiloxane main chain can vary in the range between about 3–3000.

Polysiloxane liquid crystalline polymers with mesogenic side chains are described in U.S. Pat. Nos. 4,358,391; 4,388,453; and 4,410,570; and in publications such as Makromol. Chem., Rapid Commun. 3, 557(1982); and 5, 287(1984); incorporated herein by reference.

The preparation of a polyoxyalkylene liquid crystalline polymer with mesogenic side chains is illustrated by the following polymerization reaction:

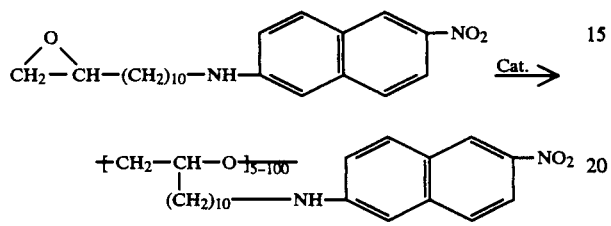

Procedures for the preparation of liquid crystalline polymers with mesogenic side chains are described in copending patent application Ser. Nos. 822,093 and 822,094, filed Jan. 24, 1986, respectively; incorporated herein by reference; and U.S. Pat. No. 4,694,066.

The preparation of side chain liquid crystalline condensation polymers is described in copending patent application Ser. No. 898,982, filed Aug. 22, 1986; incorporated herein by reference.

Nonlinear Optical Properties

The fundamental concepts of nonlinear optics and their relationship to chemical structures can be expressed in terms of dipolar approximation with respect to the polarization induced in an atom or molecule by an an external field.

As summarized in the ACS Symposium Series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry of the molecular and/or unit cell level.

Equation (2) is identical with (1) except that it describes a macroscopic polarization, such as that arising from an array of molecules in a liquid crystalline domain:

$$\Delta\mu = \mu_e - \mu_g = \alpha E + \beta EE + \gamma EEE + \ldots \quad (1)$$

$$P = P_0 + \chi^{(1)}E + = \chi^{(2)}EE + \chi^{(3)}EEE + \ldots \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave. Birefringent crystals often possess propagation directions in which the refractive index for the fundamental $\omega$ and the second harmonic $2\omega$ are identical so that dispersion may be overcome.

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which optical medium birefringence cancels the natural dispersion, i.e., the optical transmission of fundamental and second harmonic frequencies is phase matched in the medium. The phase matching can provide a high conversion percentage of the incident light to the second harmonic wave.

For the general case of parametric wave mixing, the phase matching condition is expressed by the relationship:

$$n_1\omega_1 + n_2\omega_2 = n_3\Omega_3$$

where $n_n$ and $n_2$ are the indexes of refraction for the incident fundamental radiation, $n_3$ is the index of refraction for the created radiation, $\omega_1$ and $\omega_2$ are the frequencies of the incident fundamental radiation and $\omega_3$ is the frequency of the created radiation. More particularly, for second harmonic generation, wherein $\omega_1$ and $\omega_2$ are the same frequency $\omega$, and is the created second harmonic frequency $2\omega$, the phase matching condition is expressed by the relationship:

$$n_{1\omega} = n_{2\omega}$$

where $n_{1\omega}$ and $n_{2\omega}$ are indexes of refraction for the incident fundamental and created second harmonic light waves, respectively. More detailed theoretical aspects are described in "Quantum Electronics" by A. Yariv, chapters 16–17 (Wiley and Sons, New York, 1975).

A present invention liquid crystalline polymer substrate typically is optically transparent and exhibits hyperpolarization tensor properties such as second harmonic and third harmonic generation, and the linear electrooptic (Pockels) effect. For second harmonic generation, the bulk phase of the liquid crystalline polymer substrate whether liquid or solid does not possess a real or orientational average inversion center. The substrate is a macroscopic noncentrosymmetric structure.

Harmonic generation measurements relative to quartz can be performed to establish the value of second order and third order nonlinear susceptibility of the optically clear substrates.

In the case of macroscopic nonlinear optical substrates that are composed of noncentrosymmetric sites on the molecular and domain level, the macroscopic second order nonlinear optical response $\chi^{(2)}$ is comprised of the corresponding molecular nonlinear optical response $\beta$. In the rigid lattice gas approximation, the macroscopic susceptibility $\chi^{(2)}$ is expressed by the following relationship:

$$\chi_{ijk}(-\omega_3; \omega_1, \omega_2) = Nf^{\omega_3}f^{\omega_2}f^{\omega_1} \langle \beta_{ijk}(-\omega_3; \omega_1, \omega_2) \rangle$$

wherein N is the number of sites per unit volume, f represent small local field correlations, $\beta_{ijk}$ is averaged over the unit cell, $\omega_3$ is the frequency of the created optical wave, and $\omega_1$ and $\omega_2$ are the frequencies of the incident fundamental optical waves.

These theoretical considerations are elaborated by Garito et al in chapter 1 of the ACS Symposium Series 233 (1983); and by Lipscomb et al in J. Chem., Phys., 75, 1509 (1981), incorporated by reference. See also Lalama et al, Phys. Rev., A20, 1179 (1979); and Garito et al, Mol., Cryst. and Liq. Cryst., 106, 219 (1984); incorporated by reference.

EXTERNAL FIELD INDUCED LIQUID CRYSTAL ORIENTATION

The term "external field" as employed herein refers to an electric, magnetic or mechanical stress field which is applied to a substrate of mobile organic molecules, to induce dipolar alignment of the molecules parallel to the field.

Liquid crystals (including polymeric liquid crystals) may be aligned by the application of an external field to a matrix of liquid crystal molecules. The degree of orientation is determined by the orientational order parameter. For both nematic and smectic mesophases, the parameter is defined in terms of a director which is a vector parallel to the molecular long axis (and perpendicular to the plane of molecular layering in the case of the smectic mesophase).

If theta is defined as the angle between the director and a chosen axis, then the orientational order parameter is defined as the average over all molecules of the second Legendre polynomial. The parameter ranges from $-0.5$ to $1.0$ ($1.0$ corresponds to perfect uniaxial alignment along a given axis, $0.0$ corresponds to random orientation, and $-0.5$ corresponds to random orientation confined in a plan perpendicular to a given axis).

The order parameter thus defined does not distinguish between parallel and antiparallel alignment. Thus, a sample of asymmetric rod-like molecules would have an order parameter of $1.0$ for both the case in which the molecules are colinear and all pointed in the same direction, and the case in which the molecules are colinear and form antiparallel pairs.

The application of an orienting external field to an array of nematic liquid crystal molecules results in an order parameter of approximately 0.65. Deviations from ideal order are due to nematic fluctuations on a micron length scale which accommodate characteristic defects. These fluctuations may be dynamic for small molecule liquid crystals or frozen for polymeric liquid crystals In either case, nematic fluctuations scatter light so that aligned samples appear to be hazy (particularly in a thick sample).

Smectic liquid crystals may be aligned by application of an orienting external field, with a resulting order parameter exceeding 0.9. Unlike the nematic phase, characteristic defects are removed upon aligning the smectic phase and thereby forming a single liquid crystal phase. Such phases are known as monodomains and, because there are no defects, are optically clear.

. For both the nematic and smectic mesophases, application of a DC electric field produces orientation by torque due to the interaction of the applied electric field and the net molecular dipole moment. The molecular dipole moment is due to both the permanent dipole moment (i.e., the separation of fixed positive and negative charge) and the induced dipole moment (i.e., the separation of positive and negative charge by the applied field).

The torque which results by the application of a DC electric field normally would only produce very slight alignment even for high dipolar and polarizable molecules at room temperature. The alignment torque is negligible in comparison with the disordering effect of thermally induced rotation (i.e., the Boltzman distribution of rotational eigenstates at room temperature). However, due to the unique associations developed by liquid crystalline molecules through intermolecular forces, long range orientational order on a micron length scale is present. Under these conditions, bulk orientation of the sample by application of aligning fields exceeding a few volts/cm can produce the degrees of alignment indicated above.

Application of an AC electric field also can induce bulk alignment. In this case, orienting torque occurs solely due to the interaction of the applied AC field and the induced dipole moment. Typically, AC field strengths exceeding 1 kV/cm at a frequency exceeding 1 KHz are employed for the nematic phase. At these frequencies, rotational motion of aligned nematic regions is not sufficient to follow the field. As a direct result, torque due to the interaction of the applied field and any permanent dipole moment over time averages to zero. However, electronically induced polarization is a very rapid process so that the induced dipole moment changes direction depending upon the direction of the applied field resulting in a net torque.

Application of a magnetic field also can effect alignment. Organic molecules do not possess a permanent magnetic dipole moment. In a manner analogous to AC electric field, a magnetic field can induce a net magnetic dipole moment. Torque results from the interaction of the induced dipole moment and the external magnetic field. Magnetic field strengths exceeding 10 Kgauss are sufficient to induce alignment for a nematic phase.

Alignment of nematics by electric or magnetic fields are accomplished simply by application of the field to the nematic material Alignment of the smectic phase is more difficult due to a higher viscosity which decreases rotational freedom. Formation of aligned smectic monodomains can be achieved by orienting a material in the nematic phase, and cooling the material into the smectic phase while maintaining the aligning field. For materials which have only smectic and isotropic phases and which lack a nematic phase, alignment can be accomplished in the smectic phase at an elevated temperature near the smectic to isotropic transition temperature, e.g., sufficiently close to the transition temperature so that the medium may contain smectic domains in an isotropic fluid.

Mechanical stress induced alignment is applicable to both the smectic and nematic mesophases. Strong aligning mechanical stress propagates throughout a solid liquid crystalline material due to the natural tendency of these media to self align. Specific mechanical stress methods include stretching a thin film, or coating a liquid crystalline surface with an aligning polymer such as nylon. Physical methods (e.g., stretching) rely upon the rigid and geometrically asymmetric character of certain liquid crystalline molecules to induce bulk orientation. Chemical methods (e.g., coating the surface with an aligning polymer) rely upon strong intermolecular interactions to induce surface orientation. All of the methods described above to produce oriented materials apply to both small molecule liquid crystals and polymeric liquid crystals. For polymers which possess a glass transition, the aligned liquid crystalline phase can be frozen by rapid cooling below the glass transition temperature.

Publications relating to external field-induced liquid crystal molecular orientation include The Physics of Liquid Crystals, P. G. deGennes, p. 95–97, Oxford University Press, 1974; J. Stamatoff et al, "X-Ray Diffraction Intensities of a Smectic-A Liquid Crystal", Phys. Rev. Letters, 44, 1509–1512, 1980; J. S. Patel et al, "A Reliable Method of Alignment for Smectic Liquid Crystals", Ferroelectrics, 59, 137–144, 1984; J. Cognard, "Alignment of Nematic Liquid Crystals and Their Mixtures", Mol. Cryst. Liq. Cryst.:Suppl., 1982; incorporated herein by reference.

The following examples are further illustrative of the present invention. The components and specific ingredients are presented as being typical, and various modifications can be derived in view of the foregoing disclosure within the scope of the invention.

EXAMPLE I

This Example illustrates the preparation of acrylate polymers and copolymers with pendant mesogens in accordance with the present invention.

A. 6-(6'-Hydroxyhexyloxy)-2-naphthoic acid

A 3 liter 4-neck reactor fitted with paddle stirrer, reflux condenser, long stem thermometer and pressure equalizing tap funnel is charged with 124 g (0.66 mole) of 6-hydroxy-2-naphthoic acid, 111 g (1.98 moles) of potassium hydroxide and 1 liter of dimethyl sulfoxide. The apparatus is sparged with argon and warmed to about 80° C. with stirring. The temperature then is raised to 115° C. over a one hour period, during which time a fine slurry of the potassium salt of 6-hydroxy-2-naphthoic acid forms.

A 100 g (0.733 mole) quantity of 6-chloro-1-hexanol is added dropwise from the tap funnel at about 1 drop/sec to the reaction mixture at a temperature of 110°–115° C., and the mixture is maintained at 110°–115° C. for 3 hours and then allowed to cool to room temperature with stirring. A 1500 ml quantity of water is added with stirring to the reaction mixture to dissolve a potassium chloride precipitate. The resultant clear olive green solution is stirred for one hour, then acidified (pH=2) with concentrated hydrochloric acid. The heavy precipitate which separates is filtered off and washed with water, and dried two days at 80° C. in a vacuum oven. The yield of crude acid product is 123 g (65% of theoretical).

The crude acid product is recrystallized with carbon treatment from hot ethanol to provide 70 g (37% overall) of pinkish crystals which form a nematic liquid crystal phase at 157° C. and clear reversibly at 168° C.

B. Acrylate ester of 6-(6'-hydroxyhexyloxy)-2-naphthoic acid

A 2 liter 3-neck reactor fitted with a paddle stirrer and an inverted Dean Stark water separator tube with reflux condenser is charged with a mixture of 180 ml of glacial acrylic acid, 500 ml of chloroform, 2 g of 4-methoxyphenol (inhibitor), 5 g of toluene-4-sulfonic acid (catalyst) and 87 g (0.302 mole) of 6-(6'-hydroxyhexyloxy)-2-naphthoic acid. The mixture is refluxed with stirring for 24 hours, and a total of 6 ml of water collects in the tube (theory=5.4 ml). The clear solution is evaporated under reduced pressure to provide an oily residue, which is poured into 2 liters of ice-cold water to dissolve the excess acrylic acid and precipitate the ester product as a white solid. The product medium is allowed to stand one hour, then the solid is filtered off, washed, and dried. The crude product yield is 95 g (92% of theory).

The crude product is recrystallized with carbon treatment from one liter of boiling ethanol. The hot solution is filtered through a bed of Hi-Flo Super-Cel to remove a gelatinous impurity and the carbon in an electrically-heated filter. The filtrate is heated and filtered by gravity through a Whatman #4 paper to remove traces of cloudiness. On cooling and standing for 48 hours, white crystals form, which are recovered and dried for 24 hours at 70° C. in a vacuum oven. The ester product yield is 65 g (63% of theory), mp 109°–111° C. to a nematic mesophase which turns clear sharply and reversibly at 142° C.

C. Acid chloride of 6-(6'-acryloyloxyhexyloxy)-2-naphthoic acid

A 34.2 g (0.10 mole) quantity of 6-(6'-acryloyloxyhexyloxy)-2-naphthoic acid is refluxed under anhydrous conditions with 23.9 g (0.20 mole) of thionyl chloride (99% pure), 500 ml of dry dichloromethane, and a trace of cuprous chloride as an inhibitor. After hydrogen chloride production has ceased (6 hours), the product solution is cooled and filtered through a medium porosity glass sinter. The filtrate is evaporated to dryness under reduced pressure (bath temperature 40° C.) to provide a cloudy pale brown oil, which is further dried under high vacuum overnight in a desiccator. The oil gradually sets to a pasty solid weighing 37.8 g (105% of theory).

D. 4-(4'-Nitrobiphenylyl) 6-(6'-acryloyloxyhexyloxy)-2-naphthoate

The crude acid chloride prepared above is dissolved in 300 ml of dry tetrahydrofuran to give a clear yellow solution. To the solution is added 26 g (0.102 mole) of the potassium phenoxide of 4-hydroxy-4'-nitrobiphenyl. The reaction mixture is stirred for 18 hours to provide an opaque lemon-yellow slurry. The slurry is poured into a liter of water to remove potassium chloride, and after a 3 hour standing period the crude product is filtered and then dried in a desiccator. The yield is 51 g (95% of theory).

The crude product is dissolved in hot toluene, and the solution is cooled to room temperature. Cyclohexane is added until a cloudiness appears, then the solution is cooled at −15° C. until the product separates as a pale lemon-yellow solid. The solid decomposes above 220° C. without melting. DSC indicates that the initially amorphous solid crystallizes at 80° C., melts to a smectic mesophase at 134° C., and begins to polymerize exthermically at about 180° C.

Infrared spectral analysis confirms the structure of the ester product.

E. Poly[4-(4'-nitrobiphenylyl) 6-(6'-acryloyloxyhexyloxy-2-naphthoate]

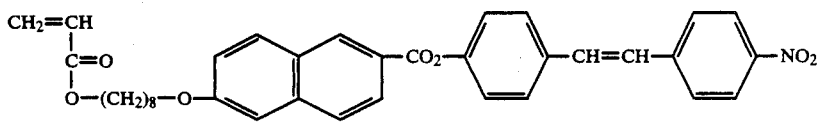

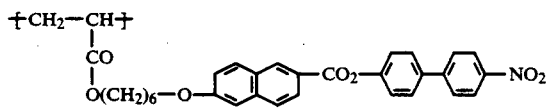

A 1.85 g quantity of the acrylate monomer prepared above is dissolved in 10 ml of hot dimethyl sulfoxide and charged to a reactor. A 1% w/v solution of azobis-cyclohexanenitrile (initiator) in dimethyl sulfoxide is added to the reaction medium, and the reactor is sparged with argon.

The polymerization is conducted at 90° C. for 96 hours. The resultant suspension product mixture is poured into 150 ml of methanol, and the crude polymer product is recovered by filtration, washed with methanol, and dried. The product yield is 0.95 g (51%).

DSC indicates an endotherm at 68° C., a $T_g$ at 41° C., and a decomposition exotherm at about 270° C. The polymer exhibits a viscous smectic liquid crystalline phase at 90°–95° C., and the polymer melt phase flows readily above a temperature of 220° C.

F. Copolymer of methyl methacrylate with 4-(4'-nitrobiphenylyl) 6-(6'-acryloyloxyhexyloxy)-2-naphthoate (50/50)

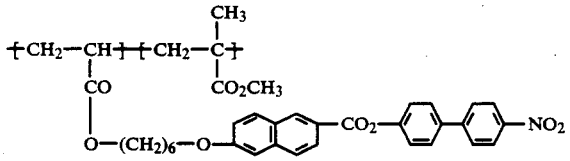

Following the procedure described above, 2.0 g of acrylate monomer as previously prepared is admixed with 0.34 g of methyl methacrylate, 0.01 g of initiator and 10 ml of dimethyl sulfoxide. The polymerization is conducted at 90° C. for 48 hours. The polymer product sets to a solid gel on cooling to room temperature. The gel is stirred with warm methanol, and the resultant suspension is filtered, and the recovered solid product is washed with methanol and then dried. The yield of copolymer product is 0.84 g (36%).

Thermo-optical microscopy indicates that the copolymer is birefringent, flows at 120° C. to a fine-grained mesophase texture, changes to a nematic texture at about 245° C., and clears to an isotropic fluid at 260° C. DSC indicates one main endotherm at 129° C., and a $T_g$ at 50° C.

EXAMPLE II

The general procedures of Example I are employed to produce the following monomers and polymers.

The acid choride of 6-(8'-acryloyloxyoctyloxy)-2-naphthoic acid is reacted with 4-hydroxy-4'-nitrostilbene to provide a monomer corresponding to the following formula:

Methacrylic acid is reacted with 6-(4'-hydroxybutylamino)-2-nitronaphthalene to provide a monomer corresponding to the formula:

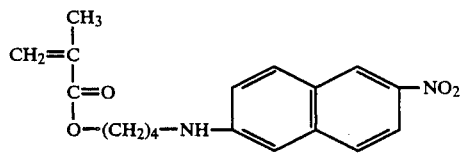

The polymerization methods of Example I are utilized to synthesize polymers and copolymers of the illustrated monomers.

Polymers and copolymers having polyoxyalkylene or condensation polymer main chains are synthesized by selection of the appropriate monomeric starting materials.

EXAMPLE III

This Example illustrates the preparation of a polysiloxane with side chain mesogens in accordance with the present invention.

A. 6-(4'-Penten-1'-yloxy)-2-naphthoic acid

A one liter 4-neck reactor fitted with a glass paddle stirrer, reflux condenser, pressure equalizing tap funnel and an inert gas inlet is charged with 56 g (1.0 mole) of potassium hydroxide dissolved in 60 ml of water, 200 ml of ethanol, and 57 g (0.30 mole) of 6-hydroxy-2-naphthoic acid. The reactor is sparged with argon, and the reaction mixture is stirred and refluxed to dissolve the acid. A 50 g (0.336 mole) quantity of 5-bromo-pent-1-ene is added to the reaction mixture at 1 drop/second over several hours, and then the mixture is refluxed for 16 hours with stirring under an argon atmosphere. After cooling, the solution is evaporated under reduced pressure to provide a tan crystalline solid, which dissolves in 1000 ml of warm water to form a soapy solution. After extracting the aqueous solution with ether, the clear aqueous solution is acidified with hydrochloric acid to precipitate the product. The thick creamy solid is filtered, washed with water, and dried. The crude yield is 65 g (84% of theory). Recrystallization from boiling ethanol provides white crystals which melt at 145°–7° C. to a nematic phase, which clears sharply and reversibly at 197° C.

B. 6-(4'-Penten-1'-yloxy)-2-naphthoyl chloride

A mixture of 20 ml of thionyl chloride (99% pure), 13.9 g of 6-(4'-penten-1'-yloxy)-2-naphthoic acid (0.054 mole) and a drop of dimethyl formamide is stirred in a reactor under anhydrous conditions, and after 16 hours a pale yellow oil is formed. The excess thionyl chloride is removed under reduced pressure to provide a viscous yellow oil weight in 15.1 g (101% of theory).

C. 4-Cyanophenyl Ester of 6-(4'-penten-1'-yloxy)-2-naphthoic acid

Crude naphthoyl chloride (15 g, 0.054 mole) as prepared above is dissolved in 100 ml of dry toluene and added to a stirred solution of 6.3 g (0.053 mole) of 4-cyanophenol in 30 ml of anhydrous pyridine in a reactor. After five days of stirring at room temperature, the resulting slurry is poured into a mixture of 100 ml of concentrated hydrochloric acid and 300 g of crushed ice. A tan solid mixed with oily material separates. The organic phase is extracted with three 300 ml portions of chloroform, and the combined extracts are washed with three 200 ml portions of 5% w/v sodium hydrogen carbonate solution, then twice with water to remove acid, and dried over anhydrous magnesium sulfate.

Evaporation of the solvent provides an oil weighing in 17.1 g (89% of theory), which crystallizes to a tan solid on standing. The crude product is dissolved in boiling acetonitrile (50 ml) and on cooling at 0° C. there is formation of large crystalline aggregates. The crystalline product is recovered, washed with fresh solvent and dried at 60° C.

The product weighs 12 g (62%) and melts at 99°–100° C. to a nematic mesophase, which clears sharply and reversibly at 161.5° C. The product structure is confirmed by infrared and mass spectral analysis.

D. Polysiloxane polymer

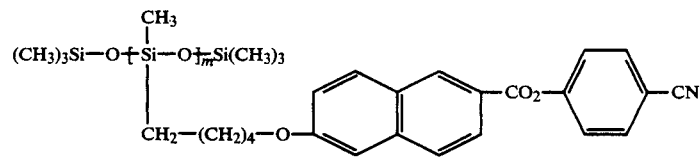

A 100 ml reactor fitted with a short air condenser topped with a serum cap is charged with 50 ml of dry degassed toluene, 10 g (0.028 mole) of 4-cyanophenyl 6-(4'-penten-1'-yloxy)-2-naphthoate, and 1.68 g of polymethylhydrosiloxane (number average molecular weight 2000–2500). The mixture is to drive out traces of air and moisture, and is then capped and allowed to cool to 60°–65° C. in a thermostatted oil-bath. Several drops (0.10 ml) of fresh solution of platinic chloride in dry isopropanol is added with a hypodermic syringe via the serum cap, and the polymer grafting reaction is conducted for 24 hours.

The reaction mixture is quenched in 800 ml of methanol with vigorous stirring, with a resultant formation of a cream waxy solid. The crude product is dissolved in dry dichloromethane (500 ml) and the solution is filtered through a bed of Hi-Flo Super-Cel to remove traces of colloidal impurities and provide a clear pale green solution. The solution is evaporated to dryness, and the residual sticky solid is lixiviated with methanol until it solidifies. After filtration, the solid product is washed, and then dried at 55° C. for 24 hours.

The polymer is examined by thermo-optical microscopy. Initially the polymer is faintly luminous between crossed polars, and it softens to a smectic mesophase melt at 112° C. and clears at 254°–260° C. On cooling the mesophase reappears at 245° C., with no evidence of nematic textures.

The DSC thermogram indicates a $T_g$ at 39° C., a first endotherm at 104° C., and a clearing point endotherm peaking at 252° C.

EXAMPLE IV

This Example illustrates a poling procedure for producing a second order nonlinear optical side chain liquid crystalline polymer medium in accordance with the present invention.

A. Poling Cell Construction

A poling cell is constructed from electrically conductive glass plates, such as Corning Glass EC-2301. The glass plates are washed with sulfuric acid, isopropanol, 1-dodecanol, and isopropanol, with a distilled water rinse between each washing step.

The poling cell is a sandwich type cell in which the conductive glass surfaces are in facing proximity and are separated by a polyimide film of approximately 25 micrometer thickness. A thin layer of epoxy adhesive is applied on the surfaces of the polyimide film to hold the glass plates.

After the epoxy is completely cured, the cell is washed with isopropanol and rinsed with distilled water. After drying, the cell is stored in a dry box.

B. Filling The Poling Cell

Poly[4-4'-nitrobiphenyloyl) 6-(6'-acryloyloxyhexyloxy)-2-naphthoate] of Example I is placed in a vacuum oven and maintained in a melt phase at a temperature of about 200° C. for about 4 hours to eliminate entrained air bubbles from the polymer melt.

The liquid crystalline polymer melt is introduced into the space between the glass plates by charging a drop of the polymer melt to one of the openings of the poling cell space and placing the cell assembly in a vacuum oven maintained at a temperature approximately 10° C. above the clearing temperature of the liquid crystalline polymer. The cell space fills gradually by capillary action. The space filling period is about 6 hours for a 0.5 cm long space. The liquid crystalline polymer melt in the filled cell is bubble-free.

C. Electric Field-Induced Orientation

Two lead wires are attached to each of the conductive glass surfaces using electrically conductive epoxy adhesive. The poling assembly is placed in a microscope hot stage (Mettler FP-82 with FP-80 Central Processor), and the sample is observed with a polarizing microscope (Leitz Ortholux Pol) for alignment.

The microscope is switched into a photodiode (Mettler Photometer No. 17517) to record the change of light intensity upon application of an electric field. The two lead wires are connected to an AC voltage amplifier (Electro-Optic Developments LA10A), which amplifies the voltage signal from a signal generator (Hewlett-Packard No. 3310B).

The poling cell first is heated to 150° C. to bring the liquid crystal polymer to the isotropic phase. The assembly then is cooled at a rate of 0.2% ° C./min. until it reaches 95° C. At this temperature, the photodiode signal registers an abrupt increase which indicates that the melt has undergone a transition into a liquid crystalline phase. The temperature is further lowered by 2° C. and then maintained at this temperature.

The AC voltage source is set at 500 V, and the frequency is set at 2000 Hz. The power to the poling cell is turned on to apply an electric field across the liquid crystalline sample The field strength is calculated to be approximately $2 \times 10^5$ V/cm About five seconds after the electric field is applied, the photodiode signal drops close to the baseline, indicating that orientation development induced by the electric field is completed. At this point, the cooling is resumed until the temperature reaches 35° C., and the poling assembly is disconnected from the power source.

When the poling assembly is removed from the microscope hot stage, by visual observation the liquid crystalline polymer in the cell space is transparent. This is an indication that the molecular orientation is uniform and homogeneous throughout the sample. Orientation of the sample is further ascertained utilizing a wide angle X-ray diffraction technique, and the Hermann's orientation factor of the sample is approximately 0.9.

D. High Field Poling For Symmetry Control

The oriented liquid crystal sample is subjected further to a higher electric field to develop a noncentrosymmetric orientation of nonlinear optical moieties which are a part of the side chains of the polymer.

The poling cell assembly is heated to 36° C., which is approximately 5° C. below the glass transition temperature of the polymer. Then the lead wires of the poling assembly are connected to a DC voltage source (Kepco OPS-3500) and the voltage is turned up slowly until it reaches 2000 V. At this point, the electric field strength across the sample is about $8 \times 10$ V/cm. The sample is maintained at this field strength level for 24 hours, and then the voltage source is disconnected. A noncentrosymmetrically oriented liquid crystalline polymer matrix is obtained when the cell sample is cooled.

The noncentrosymmetry of the sample is determined from the wide angle X-ray diffraction measurement and the thermally stimulated electrical discharge measurement. The Hermann's orientation function from the X-ray measurement is approximately 0.9.

From the measurements, there is an indication that a major proportion of the nonlinear optical moieties are aligned parallel to the electric field direction, and the rest are oriented antiparallel to the electric field direction.

What is claimed is:

1. A thermotropic liquid crystalline polymer which is characterized by a recurring monomeric unit corresponding to the formula:

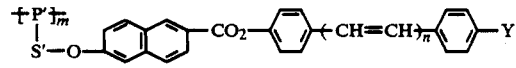

where P' is a polyvinyl polymer main chain unit, m is an integer with a value of at least 5, n is an integer with a value of zero or one, S' is a flexible spacer group having a linear chain length of between about 2–20 atoms, and Y is an electron-withdrawing substituent, and where the recurring monomeric unit comprises at least about 50 weight percent of the polymer, and the polymer has a glass transition temperature between about 0°–120° C.

2. A liquid crystalline polymer in accordance with claim 1 wherein Y is —NO$_2$, —CN or —CF$_3$.

3. A transparent nonlinear optical medium comprising a liquid crystalline polymer in accordance with claim 1.

4. A nonlinear optical medium in accordance with claim 3 which is characterized by an external field-induced orientation of aligned mesogens.

5. In an optical switch or light modulator device with a nonlinear optical component the improvement which comprises an organic nonlinear optical component consisting of a transparent solid medium comprising a polymer which is characterized by a recurring monomeric unit corresponding to the formula:

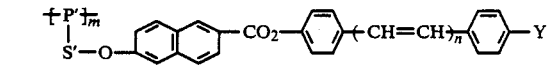

where P' is a polyvinyl polymer main chain unit, m is an integer with a value of at least 5, n is an integer with a value of zero or one, S' is a flexible spacer group having a linear chain length of between about 2–20 atoms, and Y is an electron-withdrawing substituent, and where the recurring monomeric unit comprises at least about 50 weight percent of the polymer, and the polymer has a glass transition temperature between about 0°–120° C.

6. A device in accordance with claim 5 wherein the polymer has a stable orientation of an external field-induced alignment of mesogens.

7. A device in accordance with claim 5 wherein the nonlinear optical component exhibits second order nonlinear optical susceptibility $\chi^{(2)}$.

8. A device in accordance with claim 5 wherein the nonlinear optical component exhibits third order nonlinear optical susceptibility $\chi^{(3)}$.

9. A thermotropic liquid crystalline polymer which is characterized by a recurring monomeric unit corresponding to the formula:

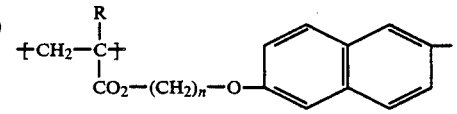

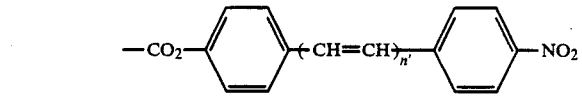

* * * * *